US006741165B1

(12) United States Patent
Langfahl et al.

(10) Patent No.: US 6,741,165 B1
(45) Date of Patent: May 25, 2004

(54) USING AN IMAGING DEVICE FOR SECURITY/EMERGENCY APPLICATIONS

(75) Inventors: Craig Langfahl, Mountain View, CA (US); Matthew Eldon Hoekstra, Forest Grove, OR (US); Maynard Falconer, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/325,947

(22) Filed: Jun. 4, 1999

(51) Int. Cl.[7] .............................................. B60R 25/10
(52) U.S. Cl. .............................. 340/426.1; 340/426.11; 340/425.5; 340/937; 701/36; 307/10.2; 348/148; 348/143; 348/152
(58) Field of Search .................. 340/426.1, 426.11, 340/937, 425.5; 701/36; 307/10.2; 348/148, 152, 143

(56) References Cited

U.S. PATENT DOCUMENTS

| 5,917,405 | A | * | 6/1999 | Joao | 340/426 |
| 5,939,975 | A | * | 8/1999 | Tsuria et al. | 340/426 |
| 6,002,326 | A | * | 12/1999 | Turner | 340/426 |
| 6,208,266 | B1 | * | 3/2001 | Lyons et al. | 340/870.02 |

* cited by examiner

Primary Examiner—Daryl Pope
(74) Attorney, Agent, or Firm—Blakely, Sokoloff, Taylor & Zafman LLP

(57) ABSTRACT

A system, apparatus and method are provided for using an imaging device for surveillance. According to one embodiment, a sensor is triggered when a situation occurs, the triggered sensor is detected, the imaging device is turned in the direction of the triggered sensor, and the imaging device is activated to capture an image.

31 Claims, 6 Drawing Sheets

USING AN IMAGING DEVICE FOR SECURITY/EMERGENCY APPLICATIONS

FIELD OF THE INVENTION

This invention relates generally to surveillance devices and more particularly, to using an imaging device for surveillance.

BACKGROUND INFORMATION

Car theft has always been an ongoing problem. It is said that for an average consumer, a car is the second largest investment the consumer would make. To protect this investment, a variety of security systems have been developed to deter car theft. One known system is the use of an alarm 106 that is connected to sensors 102 at the doors and a motion sensor 104 as shown in FIG. 1a. When the sensors are interfered with, the alarm 106 is triggered causing a horn to sound off and, perhaps accompanied by flashing headlights. This security system, in general, relies on attracting attention to the car 100 with the hope that such attention would deter the criminal attempting to break into the car. However, in many instances, after breaking into the car, the criminal merely disengages the alarm and drives off rendering the security system useless. In other instances, although the criminal has been deterred, extensive damage has already been done to the car and the chance of apprehending the criminal remote.

In another known method as shown in FIG. 1b, a wireless transmitter 112 is hidden within the car 110. When the owner realizes that the car has been stolen, the owner notifies the police or the security service of the theft. The responsible authority then activates the transmitter 112 which transmits a series of signals. A signal locator 122 deployed in a special car 120 traces the signals and homes in to locate the stolen car 110. One of the problems with this method is that the number of special cars in service are generally limited. Another problem is that the car theft often goes unnoticed until several hours later if not days, at which time the car has been driven out of range or has been cannibalized for its parts. Again, although the car may be recovered, extensive damage is already done with the remote possibility of apprehending the criminal.

All of these security systems described above are useless where an emergency, for example, an accident has occurred. For example, the security systems above do not notify the emergency response teams as to the accident or the severity of the accident. Therefore, it is desirable to provide a system in a car which is capable of providing security and/or emergency response, and further solves the shortcomings described above.

SUMMARY

A method and apparatus is described that is related to using an image device for security/emergency applications. The method comprises detecting a triggered sensor; activating an image device to capture an image; determining the nature of the triggered sensor; and generating indicator bits in accordance with the determination. Other features and advantages of the present invention will be apparent from the accompanying drawings and detailed description to be followed.

BRIEF DESCRIPTION OF THE DRAWINGS

The invention is illustrated by way of example, and not by way of limitations in the figures of the accompanying drawings in which.

DETAILED DESCRIPTION

A charge-coupled device (CCD) may be a device made up of semiconductors arranged in such a way that the electric charge output of one semiconductor charges an adjacent one. As a semiconductor technology used to build light-sensitive electronic devices such as cameras and image scanners, each CCD chip may consist of an array of light-sensitive photocells which are sensitized by giving the chip an electrical charge prior to exposure. CCD devices may detect either color or black-and-white.

Imaging a devices using charge coupled devices (hereinafter "CCD") have been in use for some time now. One use of the CCDs has been in surveillance cameras. While CCD imaging device may be used in one embodiment of the invention, a promising imaging device is the Complementary Metal Oxide Semiconductor (CMOS) pixel array imaging device. The CMOS image sensor generally uses a single power with low power consumption and further allows for simpler system designs. These advantages allow for a potential camera on a chip. Because of these features, camcorders to digital cameras using CMOS image sensors can be reduced to a miniature size while allowing for high resolution color images to be processed. Generally, a CMOS image sensor comprises an array of light sensitive pixels (i.e., pixel array) along with their associated circuitry. One feature of the CMOS image sensor as used in a digital camera is the ability to transmit discrete images at predetermined intervals.

The ability to transmit discrete images at discrete intervals of time, perhaps through a wireless medium, is desirable where the transmission bandwidth is limited. Furthermore, where the storage capacity of the transmitting and the receiving medium are also limited, such feature conserves the resources available. Due to nature of the pixels in the CMOS array, the discrete transmission of images can be easily implemented.

Figure 1A:
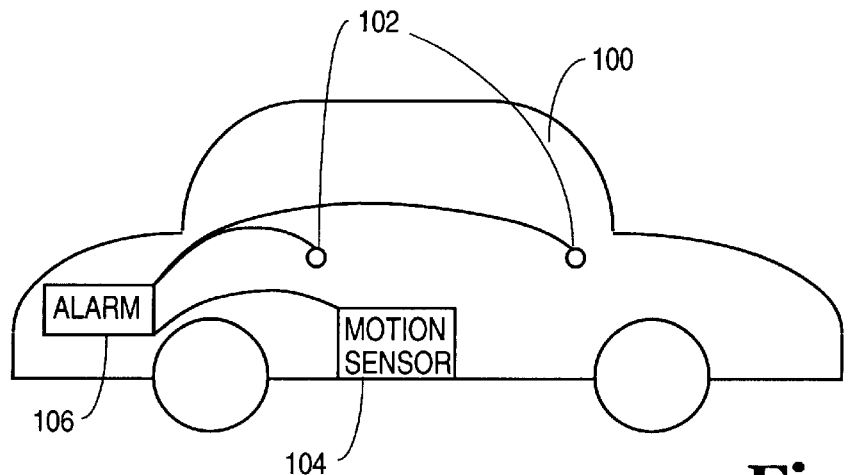
FIG. 1a illustrates one known vehicle security system.
Figure 1B:
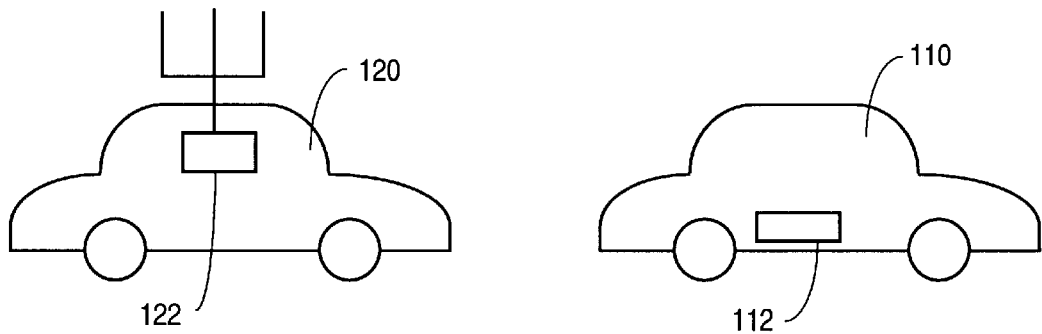
FIG. 1b illustrates another known vehicle security system.
Figure 2:
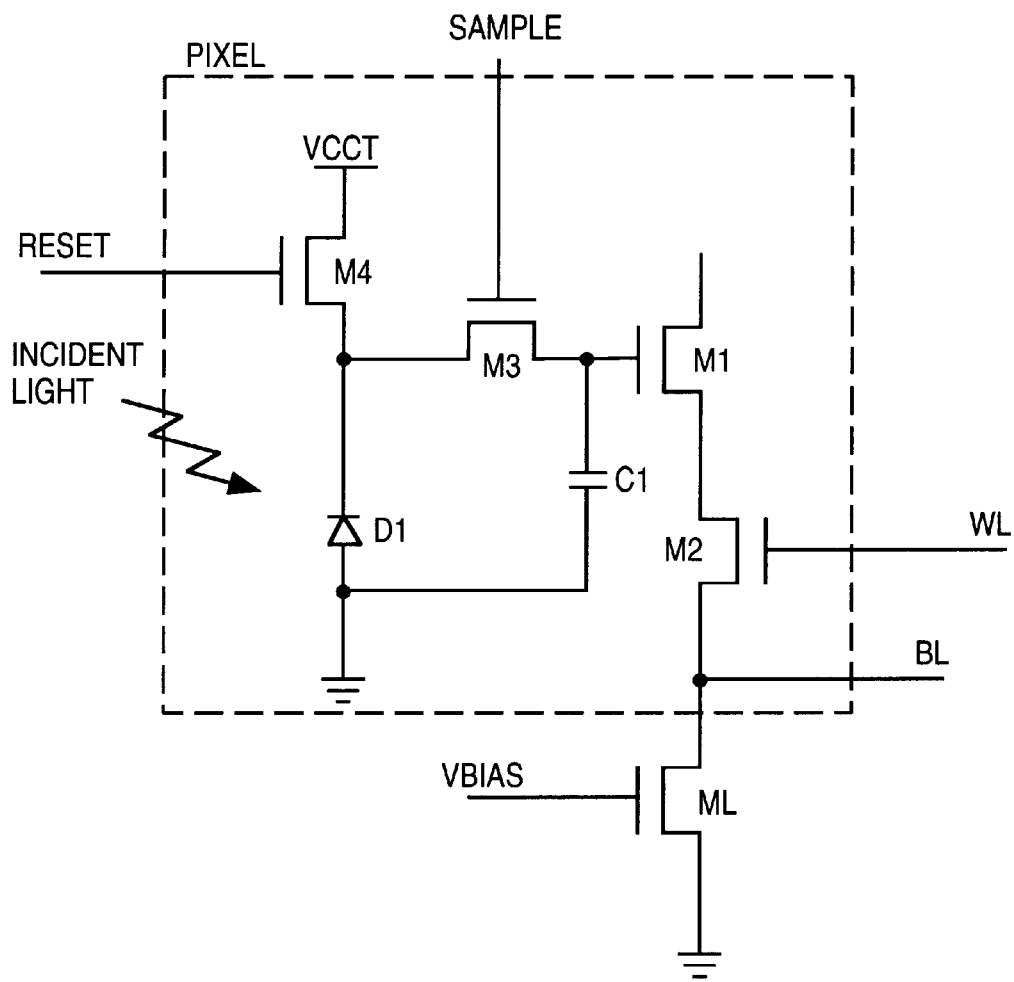
FIG. 2 is a schematic diagram of a pixel in an active pixel array of a CMOS image sensor.

FIG. 2 is an example of a pixel in a CMOS pixel array. Transistor M4 is used to precharge the photo diode DI to reset power (hereinafter "VCCT" Voltage at the Common Collector transistor) Incident light falling on the photo diode DI generates electron-hole pairs and the electrons are collected by an N-type well driving the diode D1 to a lower voltage. This lower voltage is a function of light intensity and the exposure time after precharge. This is commonly referred to as "integration time". Sampling transistor M3 and storage capacitor C1 provide the electronic shutter to capture the instant analog voltage across the photo diode D1. The transistor M2 allows for access of the analog voltage when activated. The transistor M1 comprises the top of a source follower. The transistor ML is common to each bitline (8L). Thus, by controlling the RESET and access transistor M2, the intervals between the images may be controlled.

Figure 3:
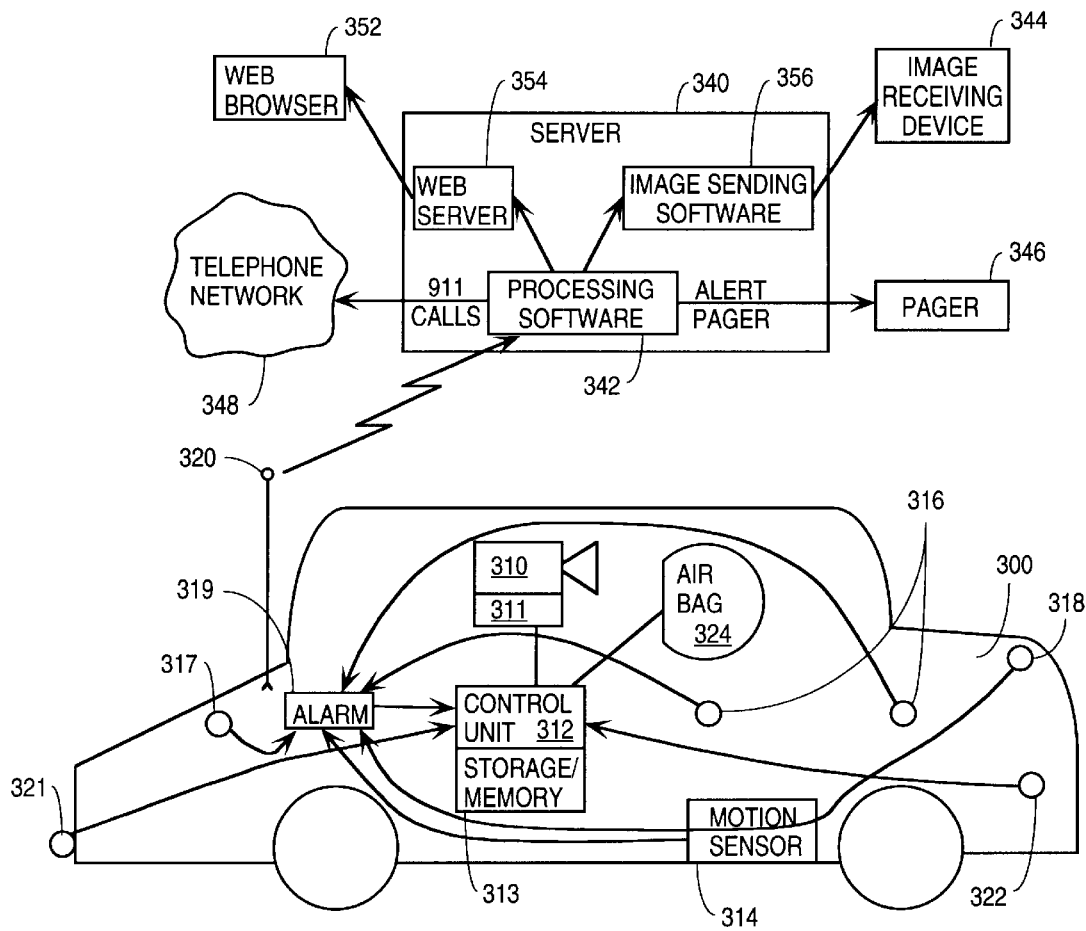
FIG. 3 illustrates an imaging device system for security/emergency applications in accordance with an embodiment of the invention.

FIG. 3 illustrates an imaging device system for security/emergency applications in accordance with an embodiment of the invention. It should be noted that various exemplary features are disclosed herein and should not be construed as limitations but are merely used to aid in the understanding of the invention. Located at the vehicle 300, there is an imaging device 310 which is suitably situated to perform the functions the system is designed for. For example, the imaging device 310 may be located on top of a dashboard and may be rotatable 360°. A motor 311 such as a servo motor or a stepper motor controls the rotation of the imaging device 310. In another embodiment, the imaging device 310 may be pivotable moving vertically up and down to a certain degree. Another motor may control the pivotal movement of the imaging device. The imaging device 310 and the motor 311 are coupled to a control unit 312 which provides the control signals to both devices. When the imaging device 310 is activated by the control unit 312, the images captured by the imaging device 310 are transmitted to the control unit 312. The imaging device 310 is generally activated by various sensors coupled to a control unit 312.

For security purposes, in one embodiment, a motion sensor 314, door sensors 316, a hood sensor 317 and a trunk sensor 318 are connected to an alarm 319 which in turn, is coupled to the control unit 312. When the alarm 319 is triggered by one of the sensors, the triggering of the alarm is detected by the control unit 312 which in turn activates the imaging device 310 to begin capturing images. The control unit 312 may also cause the motor 311 to turn the imaging device 310 towards the direction of the triggering sensor. For example, if the rear door sensor is the triggering sensor, the control unit 312 causes the motor 311 to turn the imaging device 310 towards the direction of the rear door. In this manner, images of the criminal, preferably the face, may be captured as the criminal enters through the rear door. In another example, if the motion sensor 314 is triggering the sensor, the control unit 312 may cause the motor 311 to rotate the imaging device 310 in a 360° sweep while capturing images at predetermined intervals. In this manner, an image of the criminal may be captured in the act. Additionally, some of the captured images may reveal where the vehicle is located. These images may alert the closest police patrol to be diverted to the crime scene to apprehend the criminal as will be described further below.

For emergency purposes, in one embodiment, a frontal sensor 321 is located on the front end of the vehicle, for example, the front bumper, and a rear sensor 322 is located on the rear end of the vehicle, for example, the rear bumper. Additionally, an airbag sensor 324 monitors the deployment of the airbag device if the vehicle 300 is equipped with one. If the frontal sensor 321 is triggered perhaps due to a frontal collision, the control unit 312 causes the imaging device 310 to be activated to begin capturing images. The control unit 312 may also cause the motor 311 to direct the imaging device 310 towards the front portion of the vehicle such that the imaging device 310 may capture the source that triggered the frontal sensor 321. For example, the imaging device 310 may capture the collided vehicle to record the extent of the damage and additionally, its occupants to record their conditions. Similarly, if the rear sensor 322 is triggered, the motor 311 the imaging device 310 towards the rear of the vehicle to capture the source of the trigger. In this manner, the images may capture the seriousness of the accident allowing the emergency response team to respond with the appropriate equipment. In another example, when the airbag is deployed, the control unit 312 activates the imaging device 310 and causes the imaging device 310 to make a 180° sweep within the vehicle while capturing images at discrete intervals. In this manner, the images may capture the extent of the injuries of the occupants of the vehicle, for example.

Figure 4:
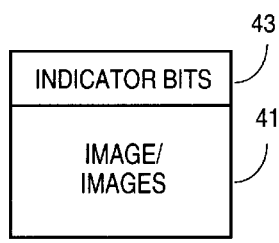
FIG. 4 illustrates an image or images transmitted with indicator bits in accordance with an embodiment of the invention.

In one embodiment, the captured images are stored in a storage/memory device 313 internal to the vehicle 300 to be retrieved as needed. Where an immediate response is desired, the images may be transmitted to an external location for process as will be described. When the imaging device 310 is activated, the control unit 312 also activates a transmitter 320. The transmitter 320 transmits the images supplied by the control unit 312 to a remote server 340 configured to receive the images. In a system designed for both a security response and an emergency response, in one embodiment, the control unit 312 distinguishes the type of response by determining which sensor has been triggered. For example, if a motion sensor 314 is triggered, the control unit 312 determines that a security breach has occurred. In this instance, the control unit 312 generates indicator bits with a code that is attached to the stream of images transmitted to the remote server 340. The code may be one or more bits of information which when decoded by the remote server is used to determine that a security response needs to be taken. In another example, if an airbag sensor 324 is triggered, the control unit 312 determines that an emergency situation has occurred. The control unit 312 generates indicator bits with a code which is attached to the stream of images transmitted to the remote server 340 When the remote server decodes the code, the remote server recognizes that an emergency response has to be taken. FIG. 4 illustrates an image or images 41 sent with indicator bits 43.

Turning back to FIG. 3, the figure further illustrates a remote server 340 in accordance with an embodiment of the invention. The server 340 comprises a processing software 342, a web server 354 and an image sending software 356. The web server 354 allows a web browser 352 to browse through its contents. The image sending software 356 allows images to be sent to an image receiving device 344. The processing software 342 has an associated hardware that is adapted to receive the transmitted images from the control unit 312. In the embodiment where indictor bits are transmitted with the images, the processing software 342 is further adapted to decode the indicator bits to make a determination as to whether the images are related to a security response or an emergency response.

In the example of a security response, the processing software 342 causes the associated hardware to transmit a pager signal that alerts the person with the pager 346 that a theft is occurring. In addition, the processing software 342 provides the image sending software 356 with the received images. The image sending software 356 transmits the images to an image receiving device 344. In this manner, the images may be reviewed by the person with the image receiving device 344. The processing software 342 may further post the received images onto a web server 354 which is retrievable by a web browser 352. This allows the person using the web browser 352 to browse through the website in the web server 354 and access the images. Further, the processing software 342 may dial 911 to notify the proper authorities that a theft is occurring. Within the message to the proper authorities the processing software 342 may also include the website in which the images are can be accessed. The notified authority may retrieve the images from the web browser 352 to determine the situation and respond appropriately.

In the example of an emergency response, the processing software 342 posts the received images onto a web server 354 which is retrievable by a web browser 352. As above, the person with the web browser 352 may access the website to obtain the images stored in the web server 354. The processing software 342 may also dial 911 to notify the emergency response team as to the emergency situation. Within the message to the emergency response team the processing software 342 may include a website in which the images can be accessed. The emergency response team may then retrieve the images from the website to determine the extent of the accident or emergency and respond appropriately. The processing software 342 may also send the images to the image sending software 356 which, in turn, transmits the images to the image receiving device 344. A person with access to the image receiving device 344 may observe the images to determine the extent of the accident or the emergency. In addition, the processing software 342 may send a pager signal that alerts the person with the pager 346 that an accident or an emergency has occurred.

In certain configurations, it should be noted that the dialing of 911 may not be required. Server 340 may be directly connected to the server of the proper authority. In this manner, a server -to-server communication is established in which the proper authority is notified through their server.

Figure 5:
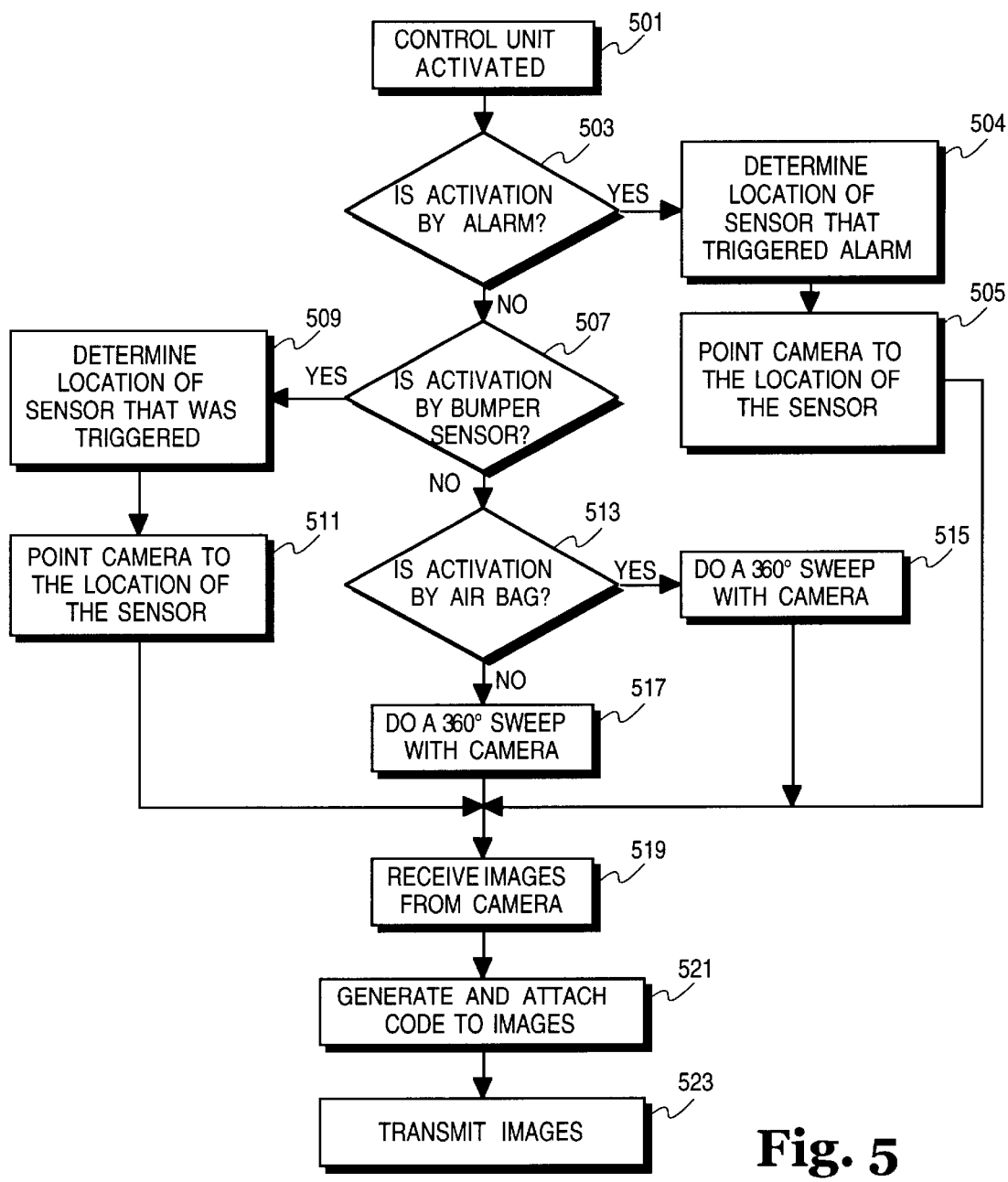
FIG. 5 is a flow chart that shows the procedures performed by a control unit in accordance with an embodiment of the invention.

FIG. 5 is a flow chart that shows image transmitting procedures performed by a control unit in accordance with an embodiment of the invention. In block 501, with an event occurring, the control unit is activated. In block 503, a determination is made as to whether the activation of the control unit was triggered by an alarm. If the activation was triggered by an alarm, in block 504, a determination is made as to the location of the sensor which triggered the alarm. In block 505, if the sensor that triggered the alarm is determined, the camera is pointed in the direction of the sensor. For example, if the rear door sensor has been triggered, the camera is directed to the direction of the rear door. If the activation was not triggered by an alarm, in block 507, a determination is made as to whether the activation was triggered by bumper sensors. If the activation was triggered by the bumper sensors, in block 509, a determination is made is as to which bumper sensor was triggered. When the determination is made as to which bumper sensor was triggered, in block 511, the camera is pointed in the general direction of the sensor. If the activation was not caused by the bumper sensors, a determination is made as to whether the activation was triggered by an air bag in block 513. If the activation was triggered by an air bag, in block 515, a command is sent to the camera to do perform a 360° sweep while capturing images at various intervals. If the activation was not triggered by an air bag, then all the sensors have been discounted.

In one embodiment, the control unit may determine that a false trigger had occurred, and deactivate itself. Alternatively, the control unit may perform a failsafe mode. In the failsafe mode, the control unit instructs the camera to perform a 360° sweep while capturing images at various intervals. In block 519, the images captured by the camera is received by the control unit. In block 521, the control unit generates a code dependent on the response. A first code may be generated if the response is a security response. A second code may be generated if the response is an emergency response. Where the control unit includes a failsafe mode, a third code may be generated to indicate the failsafe mode. The code generated is attached to the images received from the camera as indicator bits. In block 523, the images with the attached indicator bits are transmitted.

Figure 6:
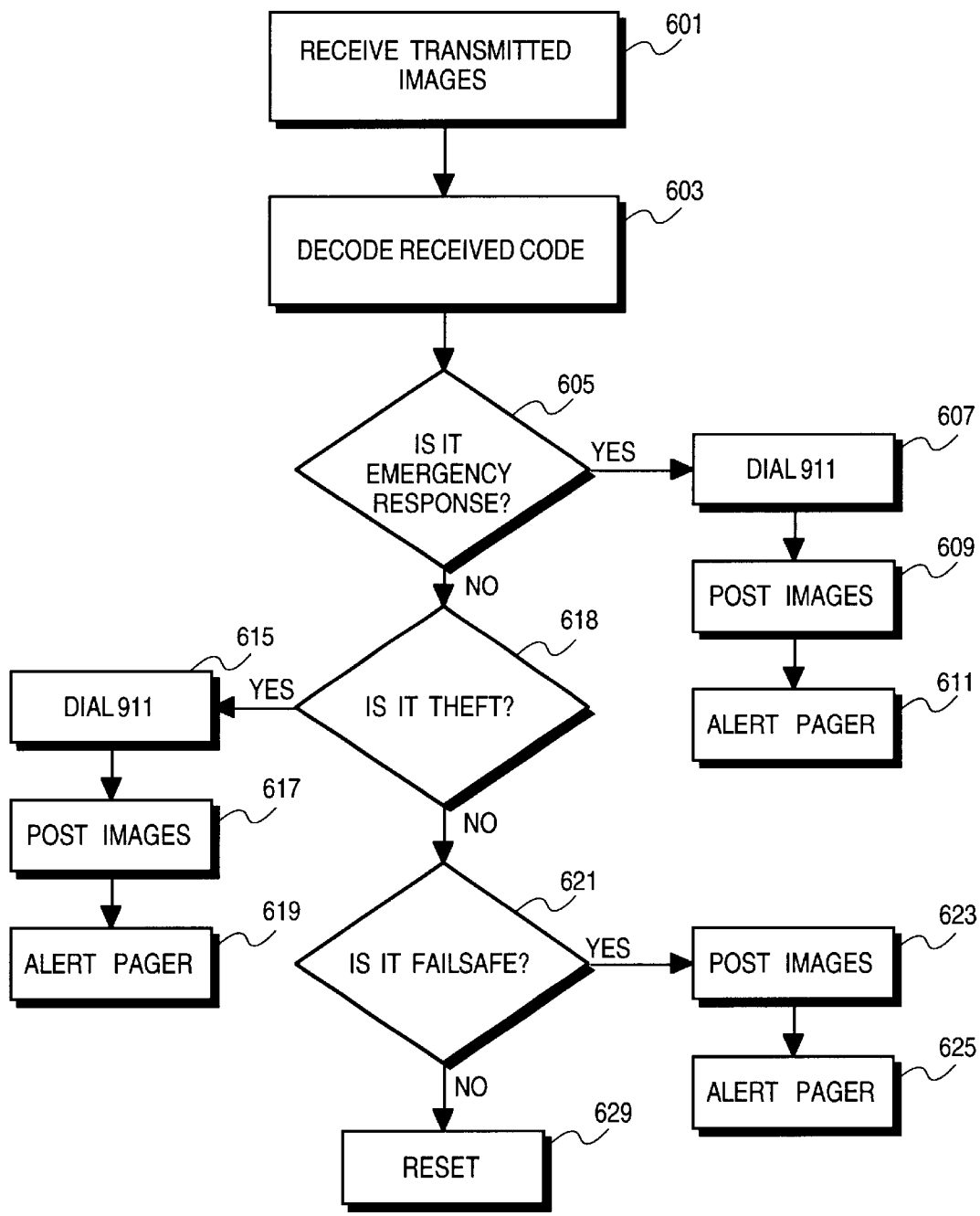
FIG. 6 is a flow chart that shows the procedures performed by a server on receiving the transmitted images in accordance with an embodiment of the invention.

FIG. 6 is a flow chart that shows the procedure performed by a server when an image transmission is received in accordance with an embodiment of the invention. In block 601, the images with indicator bits transmitted by the control unit are received by the server. In block 603, the indicator bits are decoded to determine the nature of the response. In block 605, a determination is made as to whether it is an emergency response. If it is an emergency response, in block 607, the server dials 911 to establish contact with an emergency response team. Within the message there may be a website which is accessible by a web browser. In block 609 the processing software posts the images on the web server which is accessible by a web browser. Additionally, the processing software transmits the images to the image sending software which, in turn, transmits the images to an image receiving device. In block 611, the processing software alerts a pager to indicate that an emergency has occurred. If it is not an emergency response, in block 613, a determination is made as to whether there is a theft. If there is a theft, in block 615 processing software dials 911 to contact the police. Within the message there may be a website which is accessible by a web browser. In block 617, the processing software posts the mages on a web server which is accessible by the web browser. Additionally the processing software transmits the images to the image sensing software which transmits the images to an image receiving device. In block 619, the processing software alerts a pager to indicate that a theft has occurred. If it is not theft response, in block 621, it is determined whether the code is a failsafe. This block is applicable to systems having a failsafe mode. If it is a failsafe, in block 623, the images are posted to a web server. Additionally, the images are transmitted to the image sending software which, in turn, transmits to an image receiving device. In block 625, the processing software alerts a pager to indicate that a failsafe mode has occurred. The person with a pager may use a web browser to access the website in the web server. Alternatively, if the person has access to the image receiving device, the device may be used to monitor the received images. The person may take appropriate action depending upon what the images portray. In block 627, the server resets itself to receive the next set of images with indicator bits.

Figure 7:
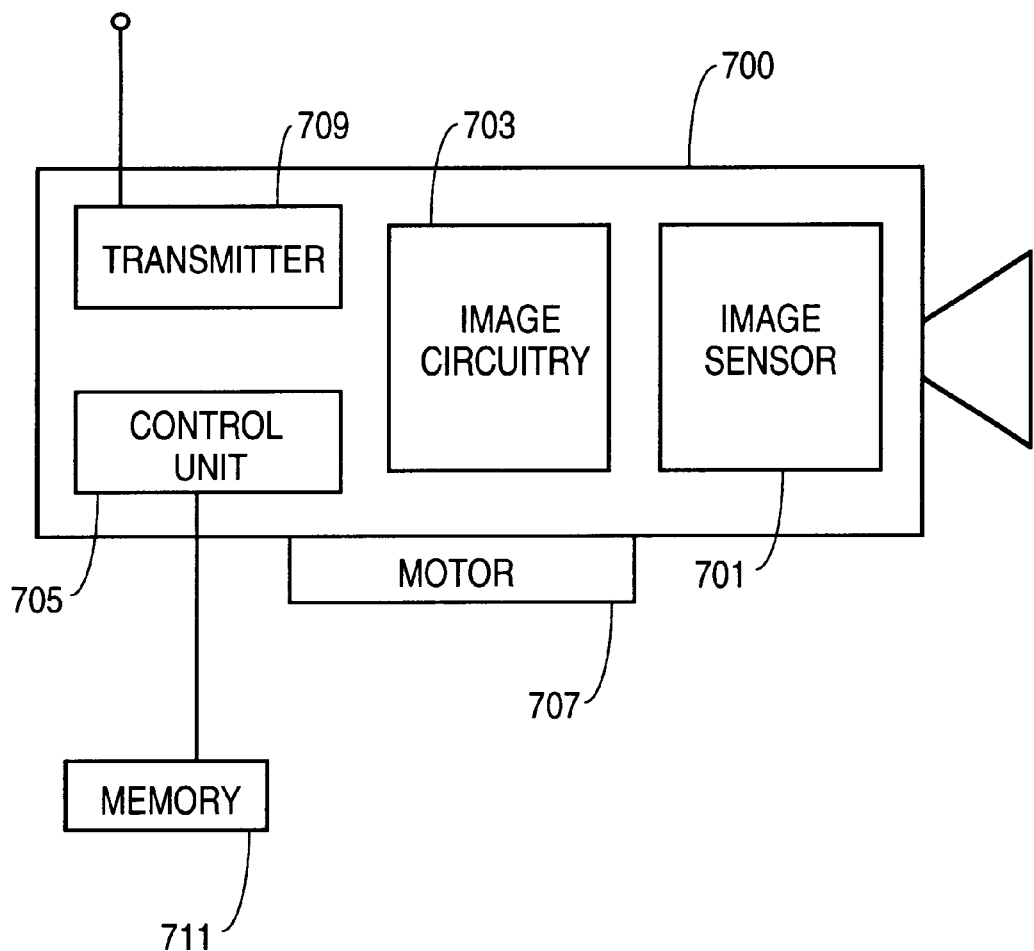
FIG. 7 is a schematic diagram of an imaging device for security/emergency applications in accordance with an embodiment of the invention.

FIG. 7 is an example of an imaging device for security emergency applications in accordance with an embodiment of the invention. The imaging device 700 may comprise an image sensor 701 to capture images. Image circuitry 703 processes the images captured by the image sensor 701. The control unit 705 is activated by various sensors connected to the control unit. The activation of a control unit has been described above in connection with control unit 312. The control unit 701 controls the motor 707 to control the movement of the imaging device when capturing images. The images received by the control unit 705 are, in turn, sent to the transmitter 709 which transmits the images to an external server. In an alternative embodiment, the images are sent to a memory for storage.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

What is claimed is:

1. A system, comprising:
   an imaging device, the imaging device having a control unit; and
   a server coupled with the imaging device to:
   receive an image having a code,
   decode the code,
   determine using the decoded code one of the following: a first response in accordance with a first situation, a second response in accordance with a second situation, and a third response in accordance with a third situation,
   store the image on a web site, and
   transmit a message to a communication device.

2. The system of claim 1, wherein the first response comprises an emergency response, the second response comprises a security response, and the third response comprises a failsafe response.

3. The system of claim 1, wherein the communication device comprises at least one of the following: a telephone, a pager, and a computer.

4. The system of claim 1, wherein the server is further to:
   contact an emergency response team;
   transmit the image to an image receiving device; and
   send a pager signal to a pager.

5. The system of claim 1, wherein the server is further to:
   transmit the image to an image receiving device; and
   send a pager signal to a pager.

6. The system of claim 1, further comprising:
   the control unit to:
   generate the code having the indicator bits, the indicator bits having information indicative of the type of response needed;
   associate the code with the image; and
   transmit the image having the code.

7. The system of claim 1, further comprises a transmitter to receive the image from the control unit and to transmit the image to the server.

8. A method, comprising:
   detecting a triggered sensor from at least one sensor coupled with an object;
   turning an imaging device coupled with the object in the direction of the triggered sensor in response to a signal from the triggered sensor;
   activating the imaging device to capture an image and
   determining one of the following: a first situation having an emergency situation, a second situation having a security situation, and a third situation having a failsafe situation.

9. The method of claim 8, wherein the emergency situation comprises an emergency response, the security situation comprises a security response, and the failsafe situation comprises a failsafe response.

10. The method of claim 9, further comprising:
    transmitting an emergency message in accordance with the emergency response;
    transmitting a security message in accordance with the security response, and
    transmitting a failsafe message in accordance with the failsafe response.

11. The method of claim 9, further comprises generating a code in accordance with the emergency situation, the security situation, and the failsafe situation, the code having indicator bits indicating the corresponding situation.

12. The method of claim 9, wherein the emergency response comprising:
    contacting an emergency response team; transmitting the image to an image receiving device; and
    sending a pager signal to a pager.

13. The method of claim 9, wherein the security response comprising:
    contacting an emergency response team;
    transmitting the image to an image receiving device; and
    sending a pager signal to a pager.

14. The method of claim 9, wherein the failsafe response comprising:
    transmitting the image to an image receiving device; and
    sending a pager signal to a pager.

15. The method of claim 8, wherein the object comprises a vehicle.

16. A method, comprising:
    receiving an image having a code;
    decoding the code; and
    determining using the decoded code one of the following: a first response in accordance with a first situation having an emergency situation, a second response in accordance with a second situation having a security situation, and a third response in accordance with a third situation having a failsafe situation.

17. The method of claim 16, wherein the code comprises indicator bits having information indicative of the type of response needed.

18. The method of claim 16, further comprising:
    storing the image on a web site; and
    transmitting a message to an external device, the message having a uniform resource locator (URL) to retrieve the stored image on the web site.

19. The method of claim 16, further comprises performing one of the following: the first response, the second response, and the third response.

20. The method of claim 16, further comprising:
    generating the code having the indicator bits, the indicator bits having information indicative of the type of response needed;
    associating the code with the image; and
    transmitting the image having the code.

21. An apparatus, comprising:
    an imaging device, the imaging device having a control unit; and
    a server coupled with the imaging device to
    receive an image having a code,
    decode the code, and
    determine using the decoded code one of the following: a first response in accordance with a first situation, a second response in accordance with a second situation, and a third response in accordance with a third situation.

22. The apparatus of claims 21, wherein the server is further to:
    store the image on a web site; and
    transmit a message to a communication device.

23. The apparatus of claim 21, wherein the first response comprises an emergency response, the second response comprises a security response, and the third response comprises a failsafe response.

24. The apparatus of claim 22, wherein the communication device comprises a telephone.

25. The apparatus of claim 22, wherein the communication device comprises a pager.

26. The apparatus of claim 22, wherein the communication device comprises a computer.

27. The apparatus of claim 21 wherein the server is further to:

contact an emergency response team;

transmit the image to an image receiving device; and send a pager signal to a pager.

28. The apparatus of claim 21, wherein the server is further to:

transmit the image to an image receiving device; and send a pager signal to a pager.

29. The apparatus of claim 21, wherein the control unit is further to:

generate the code having the indicator bits, the indicator bits having information indicative of the type of response needed;

associate the code with the image; and transmit the image having the code.

30. The apparatus of claim 21, further comprises a transmitter to receive the image from the control unit and to transmit the image to the server.

31. The apparatus of claim 21, wherein the server comprises a remote server wirelessly coupled with the imaging device.

* * * * *

UNITED STATES PATENT AND TRADEMARK OFFICE
CERTIFICATE OF CORRECTION

PATENT NO. : 6,741,165 B1
DATED : May 25, 2004
INVENTOR(S) : Langfahl et al.

It is certified that error appears in the above-identified patent and that said Letters Patent is hereby corrected as shown below:

<u>Column 2,</u>
Lines 60 and 63, delete "DI" and insert -- D1 --.

<u>Column 3,</u>
Line 6, delete "8L" with the word -- BL --.

Signed and Sealed this

Tenth Day of August, 2004

JON W. DUDAS
*Acting Director of the United States Patent and Trademark Office*